United States Patent [19]

Miller

[11] 3,937,601
[45] Feb. 10, 1976

[54] HYDROSTATIC CONTROLLER WHEREIN THE CONTROL VALVE SPOOL INCLUDES THE COMMUTATOR VALVE

[75] Inventor: Laurence Lockhart Miller, West Lafayette, Ind.

[73] Assignee: TRW Inc., Cleveland, Ohio

[22] Filed: Mar. 22, 1974

[21] Appl. No.: 453,713

[52] U.S. Cl. ............................................. 418/61 B
[51] Int. Cl.² .................... F01C 1/02; F04C 1/02
[58] Field of Search ................... 418/61 B; 60/384; 180/79.2 R

[56] References Cited
UNITED STATES PATENTS

| | | | |
|---|---|---|---|
| 3,348,493 | 10/1967 | Easton | 418/61 B |
| 3,385,057 | 5/1968 | Pruvot et al. | 418/61 B |
| 3,564,848 | 2/1971 | Baatrup et al. | 60/384 |
| 3,584,985 | 6/1971 | Baatrup | 418/61 B |

Primary Examiner—John J. Vrablik

[57] ABSTRACT

The present invention relates to a hydrostatic controller for controlling fluid flow to a device such as a steering cylinder for a vehicle. The controller comprises a gerotor gearset. The gerotor gearset includes a rotor and a stator which define expanding and contracting fluid pockets upon relative rotational and orbital movement therebetween. A control valve forms a part of the hydrostatic controller and the control valve includes a valve spool which is movable upon an input signal thereto to direct fluid to the device which is controlled by the hydrostatic controller and to receive return fluid from that device. In addition, the control valve spool in cooperation with the housing therefor functions as the commutator valve for the gerotor gearset for directing fluid to and from the expanding and contracting pockets of the gerotor gearset.

8 Claims, 7 Drawing Figures

HYDROSTATIC CONTROLLER WHEREIN THE CONTROL VALVE SPOOL INCLUDES THE COMMUTATOR VALVE

BACKGROUND OF THE PRESENT INVENTION

The present invention is directed to an improved hydrostatic controller for controlling fluid flow to a device such as a steering cylinder of a vehicle, which steering cylinder is actuated to effect powered steering of the vehicle. Hydrostatic controllers for controlling the flow of fluid to a steering cylinder of a vehicle to effect proper steering in response to rotation of the steering wheel of a vehicle are known. As is well known in the art, these structures include a gerotor gearset for metering the flow of fluid to the steering cylinder so that the steering of the vehicle is accomplished in the proper follow-up manner to the turning of the steering wheel.

Typically, these known hydrostatic controllers include a valve mechanism which, on turning of the steering wheel, ports fluid to the gerotor gearset and then receives metered fluid from the gerotor gearset portion the metered fluid to the steering cylinder. These mechanisms include a valve spool which is moved, upon turning of the steering wheel, to effect the porting of the fluid. In addition, these devices, as is known in the art, include a commutator valve arrangement which is associated with the gerotor gearset for controlling the flow of fluid into the expanding pockets of the gerotor gearset and from the contracting pockets of the gerotor gearset. The commutator valve arrangement in such structures may take a variety of different forms, and, in general, includes a number of valve parts of relatively complex design functionally interposed between the valve spool and the gerotor gearset.

Known controllers, in view of the fact that a valve spool is utilized for purposes of control of fluid flow and a separate commutator valve arrangement is utilized, require a substantial number of parts and many such controllers are of a substantial length. In addition, the component parts of the known controllers are relatively complex, all of which makes the controller somewhat difficult to assemble. In addition, the ratio of accepted versus reject controllers can be fairly high upon inspection. Moreover, small tolerances are required in the known controllers to ensure stable operation of the controllers on the vehicle. Furthermore, in the known hydrostatic controllers, the shaft seal which provides a fluid seal between the shaft connected with the steering wheel and the control valve is exposed to the highest pressure in the controller and this accordingly has created problems in terms of the proper construction and efficient construction of a good shaft seal.

SUMMARY OF THE PRESENT INVENTION

The present invention is directed to a hydrostatic controller, of the above-noted type, in which the problems noted above are minimized. Specifically, the structure of the present invention involves a substantial simplification in both the quantity and complexity of the component parts, thereby enabling both manufacture and assembly to be effected at a much higher ratio of accepted units. In addition, the machining of the valve spool which is incorporated in the present invention is simplified, since a specific small tolerance range is not required. In addition, the shaft seal which is provided in the controller is not exposed to the highest pressure within the controller, and accordingly the shaft seal can be of a more simplified and lower cost construction. Further, the overall length of the controller may be substantially reduced as compared with the length of certain known constructions.

All of the above advantages are provided by the present invention due to the fact that the valve mechanism which performs the control function of directing fluid to and receiving fluid from the device actuated by the hydrostatic controller performs not only the control function, but also performs a commutating function. The valve mechanism in the preferred embodiment which performs these two functions comprises a valve spool which is mechanically connected to the steering wheel of the vehicle and which is turned upon rotation of the steering wheel of the vehicle. The valve spool, upon initial turning of the steering wheel, is shifted to a position in which fluid is ported by the valve spool to the device actuated by the hydrostatic controller, and the valve spool ports return fluid from that device to reservoir. In addition, in accordance with the present invention, the valve spool cooperates with the housing therefor to provide a commutation valving function, as is known in the gerotor art. The commutation valve function provides for flow of fluid into the expanding pockets of the gerotor gearset as rotational and orbital movement of the stator and rotor of the gerotor gearset occur. In addition, the commutating valve function provides for receipt of the return fluid from the contracting pockets of the gerotor gearset as the relative rotational and orbital movement of the rotor and stator occur.

Combining these functions in one valve mechanism enables the elimination of a separate commutating valve mechanism, which is normally associated with the gerotor gearset and which is incorporated in known controllers. The elimination of this separate commutator valve mechanism and providing the single valve spool and housing arrangement for performing the two functions substantially reduces the number and complexity of the component parts of the hydrostatic controller. In addition, the overall length thereof may be minimized. Further, the construction is such that the shaft seal between the housing and the input shaft to the controller is not exposed to the highest pressure in the controller, thereby enabling a more simplified and lower cost seal to be utilized.

In the specific embodiment disclosed herein, the functions of providing for control of fluid flow to the steering cylinder and the commutation of fluid flow to and from the expanding and contracting pockets of the gerotor gearset are effected by the provision on a valve spool of axially extending slots located at spaced axial locations on the valve spool. The slots cooperate with passages in the housing for the valve spool. The valve spool rotates with the steering input shaft and as it rotates, the slots cooperate with passages in the housing to effect commutation. At the same time, these slots provide for and direct fluid to the steering cylinder which is to be operated by the controller.

DESCRIPTION OF THE DRAWINGS

Further features and advantages of the present invention will be apparent to those skilled in the art to which it relates from the detailed description of a preferred embodiment thereof made with reference to the accompanying drawings in which.

DESCRIPTION OF ONE PREFERRED EMBODIMENT OF THE INVENTION

As noted hereinabove, the present invention relates to a hydrostatic controller for controlling flow of fluid to a suitable device. The hydrostatic controller of the present invention may be utilized in a variety of different environments, but preferably and conventionally hydrostatic controllers of the type to which the present invention applies are generally used in hydrostatic steering systems, such as the system generally designated 10 in FIG. 1.

Figure 1:
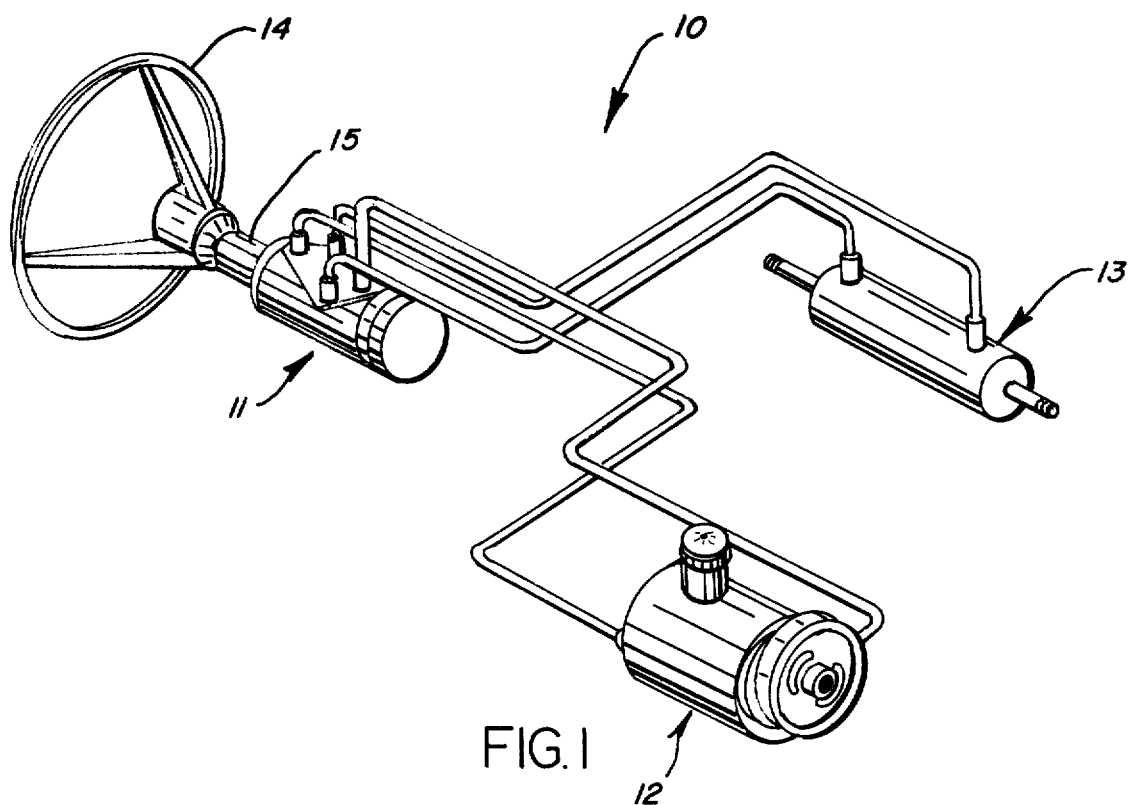
FIG. 1 is a schematic view of a hydrostatic steering system embodying the present invention.

The steering system 10 shown in FIG. 1 includes a hydrostatic controller 11, a fluid reservoir and pump 12 and a steering cylinder 13, which when actuated effects steering of a vehicle. The steering wheel 14 of the vehicle is connected by an input shaft 15 or steering column to the hydrostatic controller 11. The hydrostatic controller 11 includes a valve arrangement, to be described in detail hereinbelow, and which valve arrangement ports fluid to the steering cylinder 13 to effect actuation thereof. Suitable conduits for directing high pressure fluid from the pump and reservoir 12 to the hydrostatic controller 11 and for directing return flow from the hydrostatic controller 11 to the pump and reservoir 12 are provided. Also, suitable conduits for directing flow to the opposite ends of the steering cylinder 13 and for return flow from the steering cylinder 13 to the controller 11 are provided.

Figure 2:
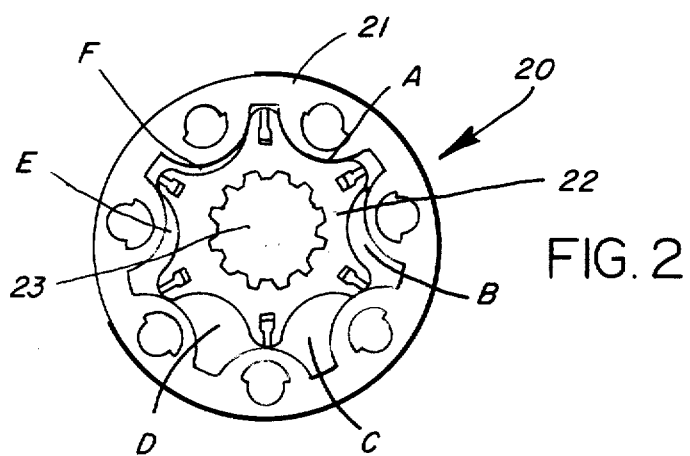
FIG. 2 is a view of a gerotor gearset used in the system of FIG. 1.

The hydrostatic controller 11, which embodies the present invention, includes a metering mechanism, generally designated 20, (see FIG. 2), and which metering mechanism functions to meter the flow of fluid to the steering cylinder 13 in response to turning of the steering wheel 14 of the vehicle. The metering mechanism is structured so as to provide for the proper amount of fluid flow to the steering cylinder 13, depending upon the amount of turning of the steering wheel 14, so that the wheels of the vehicle properly follow the steering movement of the steering wheel 14. The metering mechanism 20 comprises a gerotor gearset which includes a stator 21 which is internally-toothed and a rotor 22 which is externally-toothed. The external teeth on the rotor 22 mesh with the internal teeth on the stator 21. In the embodiment of the present invention illustrated herein, the rotor 22 of the gerotor gearset is splined to one end of a wobble shaft 23, and the wobble shaft 23 at its other end is splined to a drive coupling 24, (see FIG. 3).

Figure 3:
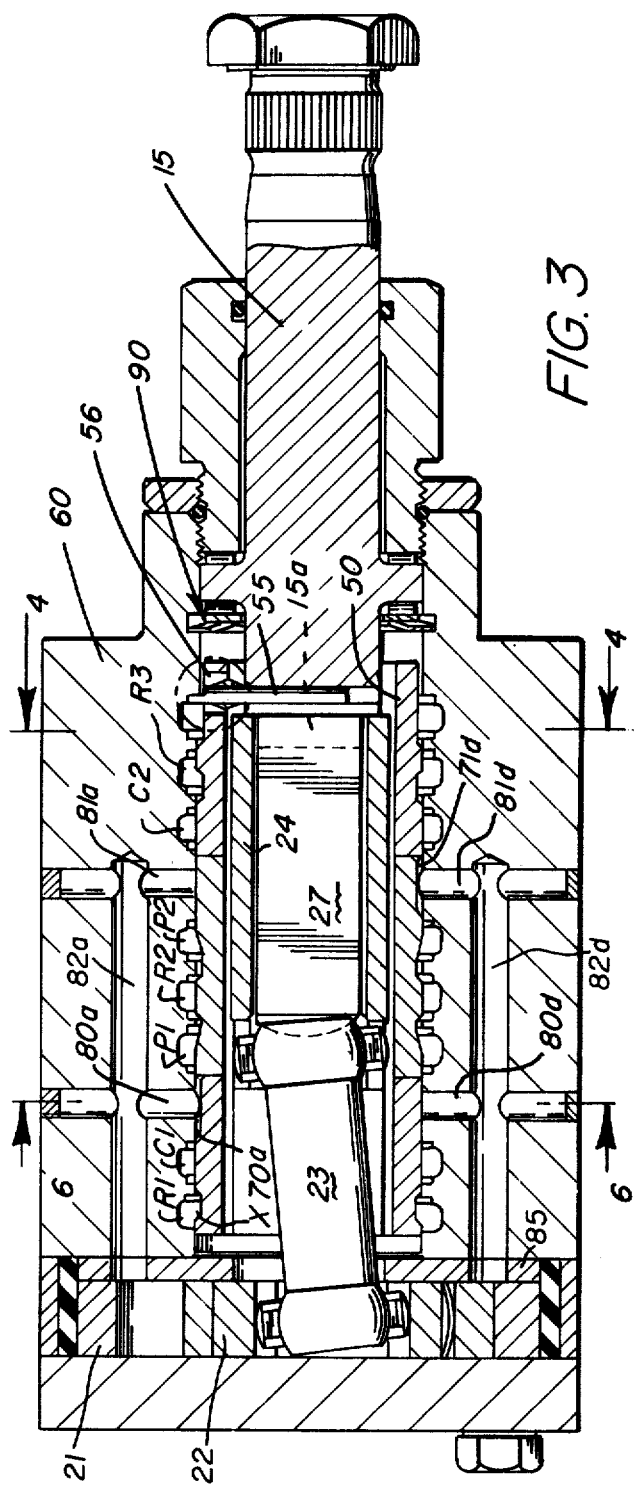
FIG. 3 is a cross-sectional view of a hydrostatic controller utilized in the system of FIG. 1 and which incorporates the gerotor gearset of FIG. 2.
Figure 4:
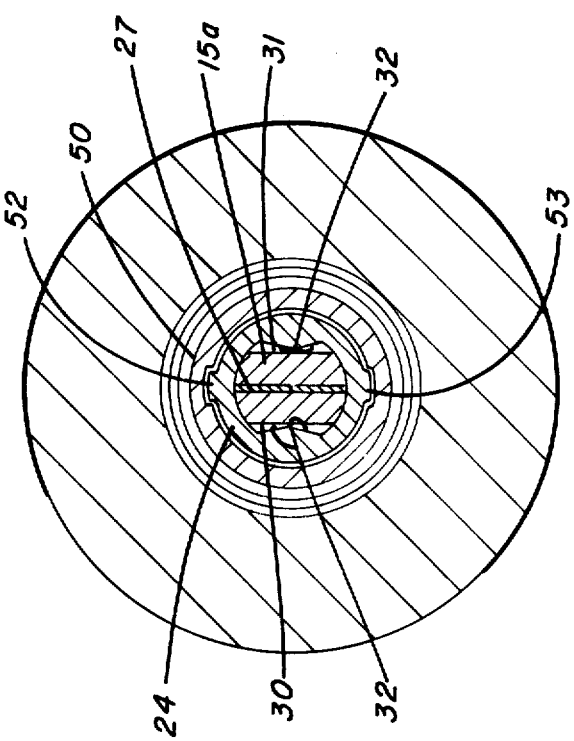
FIG. 4 is a view taken approximately along the line 4—4 of FIG. 3.

At its right end, as viewed in FIG. 3, the drive coupling 24, which is a tubular sleeve, receives a projecting portion 15a of the steering column or input shaft 15. The portion 15a is received internally within the sleeve 24. A suitable biasing structure extends between the portion 15a of the shaft 15 and the adjacent end or right end of the wobble shaft 23. This biasing structure is in the form of torsion blades 27 which are received in a slot in the inner end of the shaft 15, and which are received in a corresponding slot in the adjacent end of the wobble shaft 23 or in a suitably machined slot in the drive sleeve 24. This torsion blade construction is described in detail in copending application Ser. No. 443,463, filed Feb. 19, 1974, assigned to the assignee of the present invention.

The shaft 15, upon rotation thereof, rotates relative to the wobble shaft 23 and torsionally twists the torsion blades 27. This relative rotation occurs until side surface portions 30 or 31 of the shaft 15, depending upon the direction of rotation thereof, engage surfaces 32, 33, respectively, formed interiorly of the drive sleeve 24. After engagement of these surfaces, the rotation of the shaft 15 is transmitted through the drive sleeve 24 to the wobble shaft 23 to effect a corresponding rotation of the rotor 22 of the gerotor gearset. The wobble shaft 23, as shown, extends at an angle to the axis of rotation of the shaft 15 and wobbles upon rotation thereof as the rotor rotates and orbits. The stator of the gerotor gearset 20 is suitably secured in the housing on the controller 11 so as to be fixed or stationary therein. Accordingly, as should be readily understood by those skilled in the art, upon rotation of the rotor 22 with the wobble shaft 23, the rotor 22 will not only rotate relative to the stator 21, but it will likewise orbit relative to the stator 21. In fact, as is well known, one revolution of the rotor 22 will result in six orbits of the rotor 22 and in one-sixth of a revolution of the rotor 22, the rotor will orbit once.

The stator 21 and rotor 22 define a plurality of pockets due to the toothed configuration thereof, and in the particular embodiment illustrated there are six pockets A–F. As is understood by those skilled in the art, during the relative rotational and orbital movement of the rotor 22 and stator 21, the pockets A–F will expand and contract to effect a metering of fluid therethrough. The substantial advantages of a gerotor gearset over other types of metering and pumping mechanisms are well known and will not be described herein.

The hydrostatic controller 11 also include a valve mechanism for directing fluid from the pump 12 to the gerotor 20 and from the gerotor to the steering device 13. The control valve comprises a valve spool, designated 50. The valve spool 50 is made of three powdered metal sleeves which are suitably secured together. The valve spool 50 surrounds the drive sleeve 24, as well as the wobble shaft 23. The valve sleeve 50 is drivingly connected to the drive sleeve 24 by a splined interconnection which includes a pair of splines 52, 53 which extend from the outer periphery of the drive sleeve 24 and into slots in the inner periphery of the valve sleeve 50. Due to this interconnection, it should be clear that upon rotation of the drive sleeve 24, the valve sleeve 50 likewise rotates. Accordingly, the valve sleeve 50 will rotate upon rotation of the steering shaft 15 after the surfaces 30, 31 have engaged with surface 32 or 33, respectively.

The surfaces 30, 31 on the steering shaft 15 do not engage the corresponding surfaces of the drive sleeve 24 until a certain amount of relative rotation has occurred therebetween. This relative rotation, as noted above, effects a twisting of the torsion blades 27. Moreover, this relative rotation effects a turning of a pin 55 which extends vertically into a slot 56 formed in the valve spool 50. The pin 55 will effect a camming action on the surfaces defining the slot 56 and will cause the valve spool 50 to shift either to the left or to the right from a neutral position, depending upon the direction of rotation of the shaft 15. This in driving connection is of a conventional nature and will not be described in any more detail. It is shown in an enlarged view in FIG. 5.

The valve spool 50 is located within a bore in a housing member 60, and when the valve spool 50 is rotated, it rotates in that bore relative to the housing member 60. The bore in which the valve member 50 rotates is provided with a plurality of circular grooves which are connected to different pressures within the system. The grooves, designated R1, R2 and R3, are respectively connected to the reservoir. The groove designated C1 is connected with one side of the cylinder 15, and the groove designated C2 is connected to the other side of the cylinder 15. The grooves designated P1, P2 are connected with the pressure pump.

When in the neutral position of the valve spool, as shown in FIG. 3, fluid under pressure flowing into the pressure grooves P1, P2 communicates with the reservoir groove R2, and thus flow of fluid from the pump 12 is directed back to the reservoir. Accordingly, the valve in the embodiment shown in the drawings is an open-centered valve.

Figure 7:
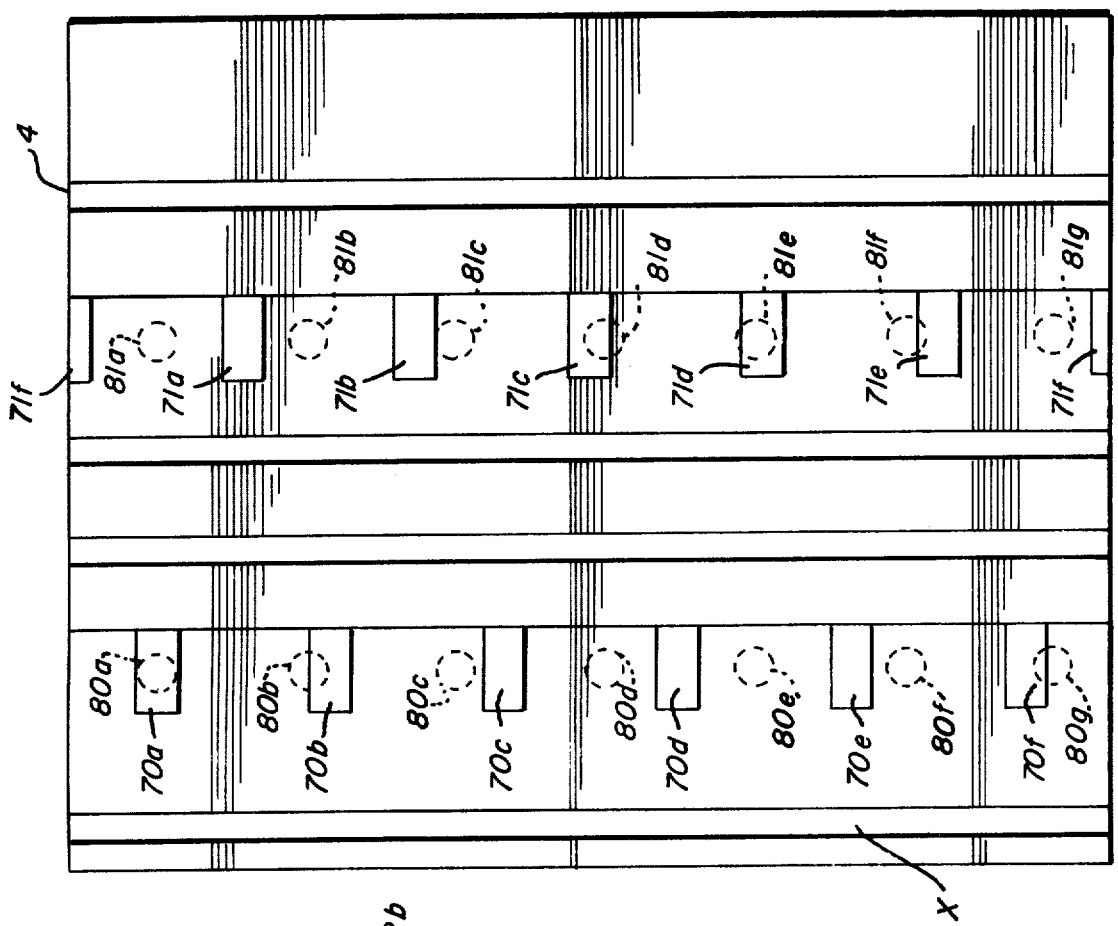
FIG. 7 is a schematic plan layout view of a valve utilized in the system of FIG. 1.

The outer periphery of the valve spool 50, as best shown in FIG. 7, includes a plurality of circumferentially equally spaced slots, designated 70a, 70b, 70c, 70d, 70e and 70f. These slots are of equal axial extent, as well as equal circumferential extent. The slots 70a to 70f are equally spaced circumferentially around the outer periphery of the valve spool and are formed in the same axial plane in the valve spool. A series of lands for blocking fluid flow is interspersed with the series of slots 70a–70f. A similar set of slots 71a–71f is also formed on the valve spool 50, but spaced axially on the outer periphery of the valve spool from the slots 70a–70f. The second set of slots 71a–71f are equally spaced apart and are located circumferentially in the spaces between the slots 70a to 70f. In other words, they are spaced from the slots 70a–70f, but are centered in the space between respective slots 70a–70f. A series of lands for blocking fluid flow is interspersed with the series of slots 71a–71f.

Figure 6:
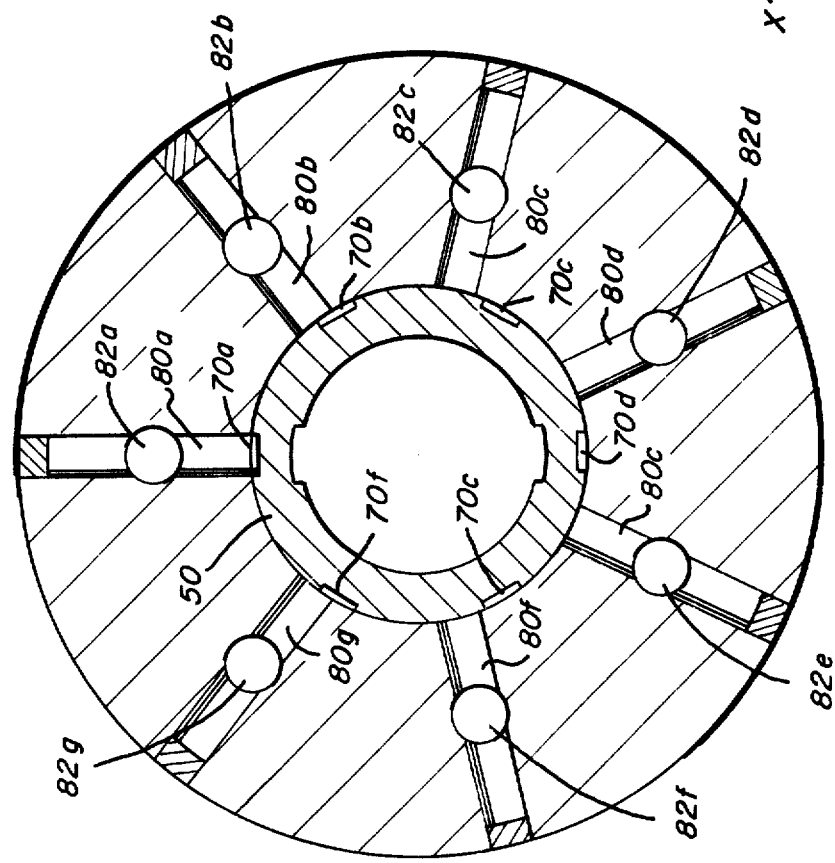
FIG. 6 is a view taken approximately along the line 6—6 of FIG. 3 with parts removed.

The housing member 60 within which the valve spool 50 is located is provided with a series of seven passages spaced apart by equal angular distances and designated 80a–80g. These passages extend radially in the housing and are plugged at their outer ends where they intersect the outer periphery of the housing member. These passages 80a–80g are formed and located so as to overlie the slots 70a–70f in the valve spool 50. A similar set of seven radially extending, equally angularly spaced passages 81a–81g (see FIGS. 3 and 7) are formed in an overlying relationship in the same plane as the slots 71a–7f in the outer periphery of the valve spool. The passages 81a–81are disposed directly beneath the passages 80a–80g as viewed in FIG. 6. The passages 81a–81g and 80a–80g are plugged at their outer ends.

Figure 5:
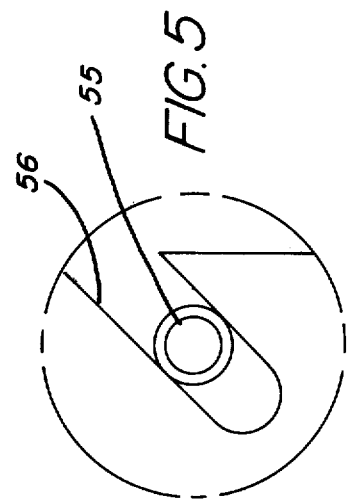
FIG. 5 is a fragmentary schematic view on an enlarged scale of a portion of FIG. 3.

The slots 70aa–70f all have an axial extent such that a portion of each of the slots 70a–70f remains in radial alignment with the plane of the central axis of the passages 80a–80g when the valve spool 50 is shifted to either the right or the left by the interaction between the pin 55 and slot 56 (see FIGS. 1 and 5). Similarly, the slots 71a–71f all have an axial extent such that a portion of each of the slots 71a–71f remains in radial alignment with the plane of the central axes of the passages 81a81g when the valve spool 50 is shifted to either the right or the left by the interaction between the pin 55 and slot 56.

In addition to the radially extending passages 80a–80g, as well as the passages 81a–81g, there are seven axially extending and equally angularly spaced passages 82a–82g, which extend axially in the housing member 60 and which intersect the face of the housing member 85 so as to communicate with the expanding pockets A–F in the gerotor gearset as the rotor and stator thereof move relatively rotationally and orbitally. The linear passages 82a–82g intersect the passages 80a–80g and the passages 81a–81g.

In view of the above-described construction, the valve spool 50 and the cooperating housing member 60 function as both a control valve for directing fluid to and from the metering mechanism 20, to and from the reservoir and pump 12, and to and from the steering cylinder 13. In addition, the control valve 50 and the housing member 60 cooperate and function as a commutator valve arrangement for directing fluid into and out of the expanding and contracting pockets of the gerotor gearset 20 in the same manner as the separate commutator valves which are known in the art.

The operation of the valve member 50 and the housing 60 to effect the dual functions of control of the fluid flow, as well as the commutating function, should be clear. However, from the following description of the operation thereof, the operation will further be understood.

As noted above, when the valve member 50 is in the position shown in FIG. 3, the reservoir port R2 is open to the pressure grooves P1 and P2 and accordingly fluid from the pump 13 flowing into the pressure ports P1 and P2 is directed back to the reservoir through the reservoir port R2.

Upon turning of the steering wheel 15 sufficiently to effect steering action and in a direction to effect shifting of the valve spool to the right, fluid will be directed from the pressure port P1 to the set of axially extending slots 70a–70f on the outer periphery of the valve spool 50. the fluid flows from these slots 70a–70f radially outwardly through the radial passages 80a–80g as the slots 70a–70f rotate and communicate with the passages 80a–80g. Some of the passages 80a–80g, of course, communicate through the axially extending passages 82a–82g with the expanding pockets of the gerotor gearset 20. The flow from the contracting pockets of the gerotor gearset is through the appropriate passages 82a–82g and through the associated radially inwardly extending passages 81a–81g to the outer periphery of the valve spool 50 in the area ajacent to the slots 71a–71f. The slots 71a–71f are thus communicated with the metered fluid from the gerotor gearset and that metered fluid is directed by the slots 71a–71f to the cylinder port C2, since the valve in this case has been assumed to have been moved to the right.

The cylinder port C2 communicates with one of the steering cylinder 13. The other end of the steering cylinder 13 communicates with the cylinder port C1, and, since the valve spool 50 has been moved to the right, the cylinder groove C1 communicates with the reservoir groove R1 through a groove X on the outer periphery of the valve spool. Accordingly, the return flow from the steering cylinder 13 is communicated back to the reservoir.

From the above, it should be apparent that when the valve spool has been moved to the right, the valve spool 50 and the cooperating passages in the housing 60 function not only to control the direction of the fluid, but also function as the conventional commutator valve arrangement which is commonly associated with gerotor gearsets in order to direct fluid to the expanding pockets and receive fluid from the contracting pockets thereof. The valve spool 50 and housing 60 combine those two functions, namely, the control function and the commutator function, in one valve mechanism, thereby greatly simplifying the structure and providing all of the advantages noted hereinabove.

It should be apparent from the above description that the valve spool 50 and housing 60 provide the dual functions when the valve spool 50 is moved to the left from neutral. The flow of fluid, when the valve spool 50 has been moved to the left, is somewhat the reverse of that when the valve spool 50 has been moted to the rignt. When the valve spool has been moved to the left, the pressure port P2 communicates with the slots 71a–71f and communicates pressure thereto. These slots 71a–71f, as they rotate past the radially extending passages 81a–81g, communicate fluid pressure to those passages. Those passages communicate with the expanding pockets of the gerotor gearset through axially extending passages 82a–82g in the housing 60. Contracting pockets of the gerotor gearset also communicate with certain of the passages 82a–82g and those passages communicate with the radial passages 80a–80g which direct fluid from the contracting pockets of the gerotor gearset to the set of grooves 80a–70f on the outer periphery of the valve spool 50. Since the valve spool has been moved to the left, the grooves 70a–70f direct the fluid from the gerotor metering mechanism to the cylinder groove C1, and accordingly metered flow is communicated to one end of the steering device 13. The other end of the steering device 13 which is in communication with the groove C2 is connected to reservoir due to the fact that the groove C2 is in communication with the reservoir groove R3. Accordingly, it should be clear that upon rotation of the valve spool 50 relative to the housing 60, the valve spool 50 and housing 60 cooperate to effect the control of the fluid flow through the valve mechanism and also function to commutate that flow.

In view of the foregoing, it is respectfully submitted that applicant has provided a substantially simplified structure in that the valving for providing for both commutation and control are combined into a single valve arrangement which reduces the number of parts in the controller. In addition, it should be clear that the shaft seal and bearing 90 for the shaft 15 are not exposed to the highest pressure within the system, but rather are exposed to return or reservoir pressure, thereby enabling a simplified shaft seal to be utilized. Also, the length of the steering unit is minimized in view of the fact that a separate commutator valve mechanism functionally interposed between the control valve and the metering section is not required. Accordingly, it should be clear that applicant has provided a substantially improved hydrostatic controller having advantages over the prior art.

Having described my invention, I claim:

1. A hydrostatic controller for controlling fluid flow to a device, said controller comprising a housing, a gearset in said housing, said gearset having relatively rotatable and orbital internal and external meshing gears, the teeth of which define chambers which expand and contract upon relative orbital and rotational movement therebetween, said housing having an inlet port and a pair of outlet ports for communication with said device, a valve spool located in said housing, said valve spool and said housing having fluid conducting passages comprising both a commutator valve means for directing fluid to said expanding pockets and for receiving fluid from said contracting pockets and a directional control valve means for directing fluid from said contracting pockets to a selected one of said outlets, said valve spool being mounted in said housing for axial and rotational movement relative thereto, an input means connected with said valve spool for effecting axial movement of said valve spool in opposite directions from a neutral position in response to rotational movement of said input means in a given direction and for thereafter effecting rotational movement of said valve spool with said input means, said commutator valve means and said directional control valve means including first and second sets of circumferentially spaced slots on the outer periphery of said valve spool, said first and second sets of said circumferentially spaced slots being axially spaced, said housing having two axially spaced sets of passages which communicate with the respective sets of slots in the valve spool and with said chambers, one set of said slots communicating fluid pressure to one set of passages in the housing and thereby communicating fluid to said expanding pockets on one direction of axial movement of said valve spool and subsequent rotation thereof, and said one set of slots receiving fluid from said one set of passages in said housing and having surfaces acting to direct fluid from said contracting pockets of said gearset on movement of said valve sleeve in the opposite direction for directing fluid to one of said outlets.

2. A hydrostatic controller as defined in claim 1 wherein when said one set of slots communicates fluid pressure to said expanding pockets on one direction of axial movement of said valve spool said other set of slots receives fluid from said contracting pockets and directs fluid to the other to said outlets.

3. A hydrostatic controller as defined in claim 2 wherein the number of said passages in each set of passages in said housing is one greater than the number of slots in each of said sets and the number of slots in each of said first and second sets being equal to the number of pockets defined by said gearset.

4. A hydrostatic controller as defined in claim 3 wherein said valve spool also includes two circumferentially extending fluid-directing grooves for directing fluid to said device and from said device.

5. A hydrostatic controller as defined in claim 4 wherein each of the slots in said first set is defined by a first pair of axially extending surfaces and by a second pair of surfaces defining the axial ends of each slot, and wherein the axial ends of each slot of said first set lie in a common plane transverse to the axis of the valve spool.

6. A hydrostatic controller for controlling fluid flow to a device, said controller comprising a housing, a gearset in said housing, said gearset having relatively rotatable and orbital internal and external meshing gears the teeth of which define chambers which expand and contract upon relative orbital and rotational movement therebetween, said housing having an inlet port and a pair of outlet ports, a valve spool located in said housing, said valve spool and housing having fluid conducting passages comprising commutator valve means for directing fluid to the expanding pockets and from said contracting pockets and directional control valve means for directing fluid from said contracting pockets to a selected one of said outlets, said valve spool having first and second axially spaced sets of slots, each of said sets of slots comprising a plurality of slots on the outer periphery of said valve spool which slots are circumferentially spaced, said housing having third and fourth axially spaced sets of passages located in a plane such that on rotation of said first and second sets of slots said slots of said first and second sets come into fluid communication with said passages of said third and fourth sets, respectively, and input means for effecting axial movement of said valve spool to communicate one of the sets of slots with fluid pressure and for effecting subsequent rotation of said valve spool to effect commutating action by said one of said sets of slots to direct fluid into said expanding pockets and by the other of said sets of slots to receive fluid from said contracting pockets.

7. A hydrostatic controller for controlling fluid flow to a device as defined in claim 6 wherein each of said slots is defined by a pair of generally axially extending surfaces and a pair of surfaces which extend transverse to the axis of said valve spool, one of said pair of transversely extending surfaces of said first set of slots upon axial movement of said valve spool moving axially relative to a pressure port in said housing so that fluid pressure communicates to said first set of slots.

8. A hydrostatic controller as defined in claim 6 wherein said slots in said second set are circumferentially located in alignment with the spaces between the slots of said first set.

* * * * *